Patented Apr. 14, 1931

1,800,502

UNITED STATES PATENT OFFICE

CASMER R. BROWN, OF LUBBOCK, TEXAS

MEDICINE

No Drawing.   Application filed March 20, 1928.   Serial No. 263,217.

This invention relates to medicinal preparations for use as germicides, parasiticides and antiseptics, and particularly to a preparation which has been successfully used in the treatment of diseases of the skin and scalp, in the treatment of genital infections, such as gonorrhea or urethritis (acute or chronic, specific or non-specific), in the treatment of cuts and bruises and as a dressing in surgical work and for other uses in medicine and surgery. Thus far it has been used very effectively for genital infections.

This medicine has also been used with great success on such skin affections as barber's itch or other ulcerated face diseases, dandruff, scalp ulcers and irritated, dry, cracked or sore scalp. Also highly satisfactory results have attended its use on piles, especially itching piles, sore or bleeding piles, before they have protruded to such an extent as to render an operation necessary. For this purpose I recommend, first application of a warm wet towel or cloth, followed by thorough application to the anus and rectum with cotton or gauze saturated with this medicine.

In the treatment of skin and scalp diseases best results are obtained by first applying a hot wet towel, and following with an application of the medicine thoroughly rubbed or massaged into the scalp or skin. It is especially effective in case of scalds or burns quickly taking the soreness out and having a soothing and cooling effect.

A general object of the invention is to provide a preparation in the nature of a relatively persistent and stable emulsion, which shall contain the reaction products of oil, (preferably vegetable oil) and compounds of sulphur, iodine, phenol and lime so combined with one another as to secure the desired therapeutic action of the said ingredients, and the reaction products thereof, but without producing the injurious effects which would result were these ingredients used separately which would be very irritating, especially in the urethra.

This medicinal preparation may be made preferably with the following ingredients which may be used in approximate proportions by volume (and substantially these proportions have successfully been used in the treatment of genital infections):—

Tincture of iodine ............................................. 2.5%
Phenol (carbolic acid) ...................................... 1.5%  } Total 7%
Solution of sulphurated lime .......................... 3%
Oil (vegetable oil) ............................................ 93%

The tincture of iodine should preferably contain both iodine and potassium iodide. I prefer to make this by first dissolving about 50 grams of potassium iodide in 50 c. c. of water, adding 70 grams of resublimed iodine (and when solution is obtained) alcohol (say 95% strength) is added to make up 1 liter.

The phenol is preferably pure carbolic acid, of say 87% concentration. In some cases cresol or xylenol may be substituted for phenol. Cresol and xylenol however are somewhat more harsh or stronger and irritating to the skin and preferably are not used on tender skin. The term "a phenol" is intended to cover such substances, or mixtures thereof.

In connection with the use of cresol and xylenol, these are both somewhat more powerful agents than phenol, $C_6H_5OH$, and this should be taken into consideration by employing considerably smaller proportions of these, if substituted for the phenol. It is also to be understood that mixtures of two or more of these substances may be employed, within the scope of the invention. The term "a phenol" as herein employed, is intended to embrace phenol ($C_6H_5OH$) and its homologues, or mixtures thereof.

The solution of sulphurated lime is preferably made by boiling together 2 parts of lime, 3 parts of sulphur (say sublimed sulphur) and 7 parts of water, while agitating the mixture. The resulting solution can be strained or filtered, and will then contain calcium poly-sulphide and calcium thio-sulphate.

The oil employed is preferably a fatty vegetable oil. Corn oil has given very satisfactory results. Cottonseed oil, peanut oil, olive oil, or mixtures of these are also suitable. Liquid animal oils are generally more expensive and not materially better for the purpose.

The foregoing proportions are those which I have found to give very good results for general use. However, the proportions can be varied somewhat. The above example includes 93% of oil with 7% of the more active components. In other cases the proportions of the latter may vary from about 3% up to 12%, more or less, depending upon the particular purpose for which the medicine is to be used.

An example of a more concentrated medicine, suitable for application to cuts, bruises, scalp and skin treatment, etc., would be:—

Tincture of iodine _____ 4%  
Phenol _____ 4%  } Total 12%  
Solution of sulphurated lime _____ 4%  
Fatty oil (preferably vegetable oil, say corn oil) ___ 88%

The medicinal preparation, aside from any precise proportions, is made as follows:—The phenol is mixed with the vegetable oil, and to this is added the tincture of iodine and the solution of sulphurated lime, and the mixture is alternately agitated violently for a time and allowed to settle for a time, over a period of about four days or longer, when the chemical reactions are complete and the emulsion is permanent. During this treatment fumes are given off from the mixture and there is a continual change in the appearance and odor thereof, and important chemical changes have taken place, as shown by analysis.

Without limiting myself to any particular theory of operation, the following are what I believe to be the principal chemical reactions taking place:—

Any free fatty acids in the oil may unite with any free lime (or even with calcium polysulfide) to produce lime soaps, or any free alkali in the emulsion may react with free fatty acid or glycerides in the oil to produce a soluble soap that in turn might react with lime or its salts to form lime soaps, which, although insoluble in water, dissolve to some extent in the oil. The lime soaps present, having a somewhat sticky or clinging tendency, cause the medicine to be retained on the skin, or mucous membrane better than aqueous or simple oily solution.

The free iodine reacts with some of the polysulfide and/or thiosulfate, forming calcium iodide, thionate compounds of calcium (say $CaS_4O_6$) and free sulphur. Some extremely finely divided free sulphur (probably partly colloidal sulphur) which on account of its fine condition and the more or less viscous character of the vehicle of oil and lime soap, remains in complete suspension.

The phenol may react, to some extent at least, with calcium thiosulphate or polysulphide, forming phenolates.

The reactions are somewhat obscure, but the following facts show that some chemical changes do take place.

(a) The medicine is non-irriating, whereas phenol, iodine and solutions of sulphurated lime are each very irritating when used separately. The medicine is not only non-irritating, but it is soothing, especially when injected into the urethral canal. It can be so injected with a syringe as is commonly used for that purpose. This medicine has been so used on hundreds of gonorrhea patients in tests, and in no instance has there been any complaint about it irritating the patient, but in all instances the patient after the injection into the urethral canal shows relief from pain, and the medicine is held in the urethral canal for fifteen to twenty minutes by the patient with a soothing, healing effect, and there is no irritation caused if some of the medicine penetrates up into the bladder. The ingredients could not be so used separately as they are too irritating, but when combined into this preparation they form a very satisfactory treatment for the disease, both in men and women. Also as a treatment for leucorrhœa it has proven very satisfactory.

(b) The combination used in the medicine does not diminish the antiseptic or germicidal value of any of the ingredients, but makes a medium with an alkaline reaction, and less irritating; and the escharotic action of phenol in this medicine is, or is practically, nil.

(c) Due to the alkalinity of the medicine it causes a change in the reaction of the urethral secretion that is inhibitory to the growth of gonococcus, for it has been proven that the gonococcus grows best about pH of 7.4. Actual tests and experiments show that the pH (or hydrogen-ion concentration) of this medicine is approximately 9. When this medicine is injected into the urethral canal it causes a change in the reaction of the secretions from the body in the urethral canal, and produces a condition or environment or atmosphere in which the gonococcus cannot proliferate. It not only stops the spread of the infection, but it penetrates the tissues, and reacts with the bodily secretions to such an extent that the gonoccoci present are killed, and thrown off. None of the ingredients if used separately will cause this effect, and herein is the principal value of this product, for treating the disease.

(d) The combination of the ingredients used in the medicine produces an alkaline drug, whereas iodine and phenol used separately are acid. An alkaline drug is beneficial in the treatment of gonorrhea, and in skin diseases. Hence the beneficial result of the medicine is to change the acid drugs to alkaline without losing the germicidal and antiseptic value thereof.

(e) This medicine when injected into the urethral canal stimulates the activity of the mucous membrane causing an increase in the number of leucocytes, or pus cells, to be thrown off, or, in other words, this combination of the ingredients increases the phagocytic action of the leucocytes. This accounts for the fact that after the patient has been using the treatment for a few days there is an increase in the flow of pus due to the fact that the mucous membrane has stimulated. The reaction of the urethal secretion has then so changed that the gonococci cannot live and proliferate.

This preparation does not act as an astringent, but as a stimulant and antiseptic thereby causing a free flow of pus and throwing off of the pus cells and gonococci engulfed by them as well as washing out of free gonococci. There is not the danger of recurrence after this type of treatment as there is where strong astringents are used. The result is that the patient has no further trouble with the breaking out of the disease some time later.

The foregoing results have been obtained by actual treatment of hundreds of cases, and by actual laboratory tests.

The antiseptic value of this medicine (7% formula, above) is equivalent to approximately a 1:150 dilution of phenol, killing macillus typhosus in 15 minutes.

An analysis of the emulsion is found to contain the oil, say a vegetable oil, soap in an insoluble form, free sulphur, potassium iodide, calcium iodide, calcium compounds of sulphur, phenolated oil, phenolates, glycerine and alcohol.

Considering the ingredients separately, the solution of sulphurated lime is a parasiticide which is used in the treatment of itch, scabies, and other skin diseases. Phenol acts as a germicide, antiseptic, disinfectant, escharotic, and is used in a dilute form, as an application to ulcers, venereal sores and hemorrhoids. Vegetable oils is demulcent and emollient. It is absorbed (far better than other oils) by the cutaneous and mucous membranes. Tincture of iodine acts as a disinfectant, parasiticide, irritant, and counter-irritant.

The mixture of these medicinal substances and the consequent chemical reactions, provide in this emulsion a preparation which embodies the desirable effects of each of the substances without producing injurious effects. The preparation is non-toxic; it will not cause the formation of scar tissue nor induce stricture.

This preparation is a combination of well known drugs, none of which, however, can be used alone in treating genital infections without the possibility of serious injury and when combined with oil an emulsion is produced which is far superior therapeutically to any one of the original ingredients used by itself.

It will be understood that the proportions of the ingredients of the preparation hereinbefore stated may be modified somewhat without departing from the spirit of the invention and that while the iodine, carbolic acid and sulphurated lime are the main active ingredients, other ingredients may be used which will not affect the stability or efficacy of the preparation. I prefer however to substantially maintain the approximate ratio of the three active components indicated, to each other, as indicated in the examples.

The present application constitutes an improvement upon my prior application Serial No. 47,631, filed August 1, 1925.

I claim:—

A medicine comprising the reaction products of the following in about the proportions stated, namely

| | Per cent |
|---|---|
| Tincture of iodine, about | 2.5 to 4 |
| Phenol (carbolic acid), about | 1.5 to 4 |
| Solution of sulphurated lime, about | 3 to 4 |
| Liquid fatty oil which does not dry readily, about | 88 to 93 |

In testimony whereof I affix my signature.

CASMER R. BROWN.